United States Patent [19]

Klingel et al.

[11] 4,159,390
[45] Jun. 26, 1979

[54] LOW VISCOSITY PLASTICIZER COMPRISING DI-TERTIARY-OCTYL-DIPHENYLOXIDE

[75] Inventors: Harry Klingel, Summit; Frank E. Ellison, Morristown, both of N.J.

[73] Assignee: American Polymers, Paterson, N.J.

[21] Appl. No.: 822,410

[22] Filed: Aug. 8, 1977

Related U.S. Application Data

[63] Continuation of Ser. No. 645,398, Dec. 30, 1975, abandoned.

[51] Int. Cl.$^2$ .................. C07C 41/12; C07C 43/20
[52] U.S. Cl. .................................. 568/635; 106/188
[58] Field of Search ............................... 260/612 R

[56] References Cited

U.S. PATENT DOCUMENTS

| 2,170,809 | 8/1939 | Coleman et al. | 260/612 R |
| 2,604,413 | 7/1952 | Kropscott et al. | 260/612 R X |

OTHER PUBLICATIONS

Olah, Friedel Crafts and Related Reactions, vol. I, (1963), pp. 68 & 86.

*Primary Examiner*—Bernard Helfin
*Attorney, Agent, or Firm*—David A. Jackson

[57] ABSTRACT

A plasticizer is disclosed which comprises di-tertiary-octyl-diphenyloxide possessing a viscosity in the range of from about 1000 to 2100 centistokes. The plasticizer of the present invention is advantageously employed in film-forming cellulosic derivatives such as ethylcellulose which may be molded by extrusion. A method of synthesizing the plasticizer is also disclosed.

5 Claims, No Drawings

LOW VISCOSITY PLASTICIZER COMPRISING DI-TERTIARY-OCTYL-DIPHENYLOXIDE

This is a Continuation, of application Ser. No. 645,398, filed Dec. 30, 1975 and now abandoned.

BACKGROUND OF THE INVENTION

The present invention relates generally to certain alkylated diphenyl oxide derivatives useful as plastisizers for cellulosic derivatives, and particularly to a di-tertiary-octyl diphenyloxide possessing unique characteristics useful in the preparation of plasticized ethycellulose compositions.

The preparation and general utility of alkylated diphenyloxide derivatives is known and has been described in U.S. Pat. No. 2,170,809 to Coleman et al. The aforementioned disclosure broadly suggests the utility of this class of compounds as plasticizers, and provides a general synthesis involving the condensation of diphenyl-oxide or a lower alkyl derivative thereof with an alkylating agent such as an alkyl halide, olefin or alcohol, and an alkylating catalyst selected from the group of materials known as "Friedel-Crafts catalysts." The particular derivative of interest herein is prepared by the synthesis set forth in Example 7 of Coleman et al.

Further mention of the di-tertiary-octyl derivative appears in U.S. Pat. No. 2,604,413, to Kropscott et al which relates to plasticized ethylcellulose compositions, wherein said derivative is reported as being prepared by an essentially Friedel-Crafts condensation.

Though the dipheyloxide derivatives taught by Coleman et al and Kropscott et al possess recognized utility as plasticizers, a need exists to further modify the plasticized ethyl-cellulose composition to provide an improvement in properties at a reduction in materials costs. This is particularly true in the instance under consideration herein, wherein the ethyl-cellulose material is desirably extruded to form a continuous thin film strip product. Ideally, the reduction of plasticizer content of the cellulosic resin without the corresponding diminution in processability would be desirable, as the presence of the plasticizer detracts from the tensile properties of the extruded strip product.

SUMMARY OF THE INVENTION

In accordance with the present invention, a plasticizer is disclosed which possesses a significantly reduced viscosity of the order of about 1000 to about 2100 centistokes at 25° C. wherein said plasticizer comprises di-tertiary-octyl-diphenyloxide. The present plasticizer is particularly useful in mixture with ethycellulose, where favorable processability can be achieved together with the consequent retention of the full extent of the favorable properties which characterize the unplasticized resin.

The plasticizer of the present invention is prepared by a method comprising reacting diphenyloxide, di-isobutylene and a material selected from the group consisting of "Friedel-Crafts"—type catalysts, and washing the product of said reaction successively with aqueous solutions of hydrochloric acid and sodium carbonate, wherein intermediate said successive washing steps, said product is subjected to at least one wash with hot water.

The plasticizer of the present invention exhibits a significantly reduced viscosity from that either achieved or expected with the comparable material disclosed in the art, as earlier set forth. By comparison, the prior art material has been measured to possess a viscosity ranging from 5000 to 7000 centistokes, measured at 25° C. This difference in viscosity enables the plasticizers of the present invention to serve in a comparable capacity at a reduced level in the composition. Moreover, the reduced viscosity enhances the processibility of both the plasticizer and the plasticized resin.

The method of the present invention provides a readily reproducible technique for the preparation of the plasticizer, which confers greater economy of manufacture.

Accordingly, it is a principal object of the present invention to provide an alkyl substituted diphenyloxide plasticizer useful with cellulose derivative resins, which is of reduced viscosity.

It is a particular object of the present invention to provide a plasticizer as aforesaid comprising di-tertiary-octyl-diphenyloxide possessing a viscosity at 25° C. of from about 1000 to about 2100 centistokes.

It is a further object of the present invention to provide a method for the preparation of the plasticizer as aforesaid which is economically expedient.

Other objects and advantages will become apparent from the ensuing description.

DETAILED DESCRIPTION OF THE INVENTION

In accordance with the invention, the foregoing objects and advantages are readily attained.

The present invention comprises a plasticizer comprising di-tertiary-octyl-diphenyloxide, which possesses a viscosity, measured at 25° C. of from about 1000 to about 2100 centistokes.

The plasticizer of the present invention may be employed in admixture with resinous cellulosic derivatives, specifically ethylcellulose, which are manufactured into continuous film or strip by an extrusion process. The resultant products possess favorable flexibility without evidence of a decrease in tensile properties from those of the resin alone.

A particular end use of the film or strip prepared, utilizing the plasticizer of this invention is the manufacture of inhibitor-strips installed in the detonating mechanisms of missile warheads and the like.

The plasticizer of this invention may be prepared by a process which comprises reacting diphenyloxide, di-isobutylene and a material selected from the group consisting of "Friedel-Crafts"—type catalysts and washing the product of said reaction a plurality of times with successive aqueous solutions of hydrochloric acid and sodium carbonate, wherein intermediate said successive washing steps, said product is subjected to at least one wash with hot water while being maintained at a temperature of about 60° C.

The reaction conducted herein comprises a condensation involving diphenyloxide and di-isobutylene in the presence of an alkylation catalyst selected from those catalysts known to promote a "Friedel-Crafts" reaction. Di-isobutylene is commercially available as a mixture of about 80% of 2, 4, 4 trimethyl-1-pentene to "Friedel-Crafts" catalysts are well known in the art and comprise such materials as aluminum chloride, aluminum bromide, activated bleaching earths, ferric chloride, boron tri-fluoride, and the like. In accordance with the present invention, the preferred catalyst composition comprises aluminum chloride anhydrous.

The above reaction is conducted at a temperature of at least 60° C., and is preferably conducted at a temperature of about 60° C. in a glass-lined reaction vessel. The desired quantity of diphenyloxide is first added to the vessel and the temperature is raised to the 60° C. level. After reaching the foregoing temperature, anhydrous aluminum chloride is added in the proportion of 2.8 grams of aluminum chloride for each mol of diphenyloxide. The resulting mixture is stirred until the aluminum chloride is completely dissolved. The di-isobutylene is finally added to this mixture with continuous agitation, over an extended period of from about 3 to about 3½-hours to facilitate the maintenance of the temperature of the mixture at or about 60° C. After the addition of di-isobutylene, the reaction is continued for an additional ½ hours to assure completion.

The resulting reaction product is next washed with a 10% aqueous solution of hydrochloric acid of a quantity sufficient to remove the aluminum compounds from the product. During this wash, the product is vigorously agitated, as by stirring or the like, tto enable the fullest possible interaction of the acid therewith, while the temperature is maintained at 60° C. After the agitation is stopped, the mixture is allowed to settle whereby the aqueous layer separates and is drained off.

Conventionally, the next operation in the preparation of the diphenyloxide comprises a wash with an aqueous solution of sodium carbonate for the purpose of neutralizing the product volume. In accordance with the present invention, however, it has been unexpectedly found that the viscosity of the final product may be significantly reduced by the employment of at least one hot water wash operation conducted intermediate and after said hydrochloric acid and said sodium carbonate rinses respectively. The washes of the present invention are conducted with hot water and rely on the same method of execution as is employed with said acid and said carbonate washes. Thus, the hot water is applied under agitation and at a temperature consistently maintained at about 60° C.; and when the application of the water is completed, the product is allowed to settle in order that separation and drain-off of the aqueous layer may occur.

The hot water washes of the invention are conducted for a period of time varying with the volume of product involved. The temperature of the water generally ranges from about 60° to 100° C. and, preferably, closely approximates the 60° C. temperature level primarily employed in most all aspects of the present method. Though illustrated hereinbelow as employing singular hot water washes, the process of the present invention contemplates that multiple recurring washes may be used to more thoroughly flush the reaction product. When the above parameters are broadly observed, the resulting products are found to possess all of the claimed attributes of reduced viscosity and the like, desired in accordance with the present invention.

After the first series of hot water washes is conducted, the product is exposed to the aforementioned wash treatment comprising the 3% aqueous solution of sodium carbonate. As with the earlier washes, vigorous agitation and maintenance of temperature at or about 60° C. is required. Completeness of this treatment may be checked by testing with Congo red indicator paper. Separation and drawing-off procedures employed herein are identical.

After the completion of the above, the product is given an additional, final exposure to the aforementioned hot water wash, under the same conditions specified earlier. The resultant product is then vacuum stripped at a pressure of from 2 to 5 mm Hg, while being heated to 180° C. to remove unreacted diphenyloxide, isobutylene and lower oligomers.

Once vacuum stripping is finished, the resultant product is transferred while hot to a container for storage, use or the like.

The invention will be better understood from a consideration of the following illustrative example.

EXAMPLE

Three samples of a material determined as ditertiary-octyl diphenyloxide were prepared for comparative testing. Sample A represented the material disclosed in U.S. Pat. No. 2,604,413, in column 2, which was prepared with reference to Example 7 of U.S. Pat. No. 2,170,809. Neither patent suggests the employment of the hot water washing steps of the present invention.

Samples B & C comprise comparative formulations representing the present invention which were prepared as follows:

468 grams (2.75 mol) diphenyloxide was reacted with 7.7 grams (0.06 mol) aluminum chloride and 726 grams (6.48 mol) of di-isobutylene at 60° C. for a total reaction time of 3.5 hours. The reaction volume was washed with 400 ml. of 10% HCl and the aqueous layer was drawn off. The product layer was then sequentially washed with a volume of hot water equal to product volume at a temperature of between 50 and 60° C., 200 ml of 10% sodium carbonate, followed by a repetition of the hot water washing sequence. The resultant material, which amounted to 1166 grams, was then vacuum stripped at 2 mm pressure with a $N_2$ bleed under a temperature rising to 180° C. The final product was a slightly yellow, clear solution representing a yield of approximately 986 grams, or 83% for the above amounts.

Samples A, B and C were tested for viscosity, refractive index, color and density, and are set forth in the table below, together with the values recited in the disclosure of U.S. Pat. No. 2,604,413, column 2, lines 24-39.

TABLE

| PROPERTIES - THEORETICAL AND OBSERVED - FOR Bi-TERTIARY-OCTYL-DIPHENYLOXIDE | | | | |
|---|---|---|---|---|
| | '413 PATENT | A | B | C |
| REFRACTIVE INDEX 20 C | 1.525 | 1.508 | 1.504 | 1.503 |
| VISCOSITY at 25° C. (in centistokes) | 5,000–7,000 | 7400 | 1610 | 1232 |
| COLOR | — | Gardner 2 | Gardner 4 | Gardner 5 |
| DENSITY 25°/4' | 0.944–.952 | 0.948 | 0.932 | 0.931 |

From the above table, it is apparent that a wide difference exists between Samples B and C representing the present invention and comparative Sample A, regarding the achieved viscosity of the product. Clearly, the sample prepared in accordance with the invention possess significantly reduced viscosities while retaining comparable levels of other critical properties such as color, density and refractive index, which would suggest their utility in applications such as extrusion applications, where reduced viscosity is advantageous to processability.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A plasticizer for use with resinous film forming cellulosic derivatives which comprises di-tertiary-octyl-diphenyloxide having a viscosity measured at 25° C. which ranges from about 1000 to about 2100 centistokes, said di-tertiary-octyl-diphenyloxide prepared from a method which comprises reacting diphenyloxide, di-isobutylene and a "Freidel-Crafts" catalyst comprising aluminum chloride, washing the reaction product resulting therefrom successively with aqueous solutions of hydrochloric acid and sodium carbonate, wherein intermediate and following said successive washings steps, said product is subjected to at least one wash with hot water ranging in temperature from about 60° to about 100° C.

2. A method for the preparation of a plasticizer comprising di-tertiary octyl-diphenyloxide having a viscosity measured at 25° C. of from about 1000 to about 2100 centistokes, said method comprising reacting diphenyloxide, di-isobutylene and a "Friedel-Crafts" catalyst comprising aluminum chloride, washing the reaction product resulting therefrom successively with aqueous solutions of hydrochloric acid and sodium carbonate, wherein intermediate and following said successive washing steps, said product is subjected to at least one wash with hot water, wherein said hot water ranges in temperature from 60° C. to 100° C.

3. The method of claim 2 wherein said diphenyloxide is added first to a reaction vessel, said vessel is raised to about 60° C., said catalyst is added thereto in the ratio of 2.8 grams of catalyst for each mol of said diphenyloxide, and said di-isobutylene is subsequently added thereto.

4. The method of claim 3 wherein said reaction between said diphenyloxide, said catalyst and said di-isobutylene extends for from 3 to 4 hours.

5. The method of claim 2 wherein said reaction product is finally stripped at a temperature of 180° C. subsequent to the completion of said washing steps.